United States Patent [19]

Keshav

[11] Patent Number: 5,627,970
[45] Date of Patent: May 6, 1997

[54] METHODS AND APPARATUS FOR ACHIEVING AND MAINTAINING OPTIMUM TRANSMISSION RATES AND PREVENTING DATA LOSS IN A PROCESSING SYSTEM NEWORK

[75] Inventor: Srinivasan Keshav, Berkeley Heights, N.J.

[73] Assignee: Lucent Technologies Inc., Murray Hill, N.J.

[21] Appl. No.: 287,018

[22] Filed: Aug. 8, 1994

[51] Int. Cl.⁶ .......................... G06F 13/36; G06F 13/38; G06F 13/376
[52] U.S. Cl. .................. 395/200.13; 395/200.17; 364/DIG. 17; 364/DIG. 2; 370/232; 370/236; 370/394; 370/468
[58] Field of Search .................. 395/800, 200.06, 395/200.02, 200.13, 200.07, 200.17, 200.1; 370/17, 84, 60, 94.1; 340/825.5; 364/DIG. 1, DIG. 2

[56] References Cited

U.S. PATENT DOCUMENTS

| | | | |
|---|---|---|---|
| 4,777,595 | 10/1988 | Strecker et al. | 395/260.17 |
| 5,193,151 | 3/1993 | Jain | 395/200.06 |
| 5,359,593 | 10/1994 | Derby et al. | 370/17 |
| 5,400,329 | 3/1995 | Tokura et al. | 370/84 |

*Primary Examiner*—Daniel H. Pan

[57] ABSTRACT

Disclosed are methods and systems for achieving and maintaining data transmission rates in processing system networks, independent of communication between the node and the processing system network, and including techniques for data transmission initialization, data retransmission, and buffer management. Data transmission initialization includes transmitting data packets from a source node over a network at an adaptive exponential transmission rate from a current operating point to an optimal operating point. The optimal operating point is a data transmission rate wherein data buffers are neither overflowing nor under-flowing. Data retransmission includes transmitting data packets at the optimal set point, detecting the loss of a transmitted data packet as a function of a timer-less acknowledgement signal, and retransmitting the lost data packet. Buffer management includes redetermining the optimal operating point in response to unexpected changes in the data transmission bandwidth of the network, wherein detection of such changes is preferably accomplished using a dynamic set point probing procedure.

35 Claims, 4 Drawing Sheets

METHODS AND APPARATUS FOR ACHIEVING AND MAINTAINING OPTIMUM TRANSMISSION RATES AND PREVENTING DATA LOSS IN A PROCESSING SYSTEM NEWORK

TECHNICAL FIELD OF THE INVENTION

The present invention relates in general to processing system networks, and in particular to methods and systems for achieving and maintaining nodal data transmission rates over a processing system network.

BACKGROUND

A processing system network is a combination of two or more independent nodes, for example, an independent processing system or another processing system network, which are capable of conversing with each other over a communications path or link. The conversation between the nodes involves the transfer of data packets which are a collection of related data items. The conversation may concern access to data files, applications or other information, or may consist of a request by one node to borrow one or more of another node's resources. Resources, for example, may include database files, peripheral devices, such as printers, or additional processing power.

Integrated networks are the emerging model for network design. In an integrated network, data packets are intelligently multiplexed between constant and variable bit-rate and bursty sources. This provides individual nodal connections with quality of service guarantees in one of two classes. In the first class, each node regulates its own traffic, fitting its data transmission rate within a particular behavioral range, and receiving in exchange certain network performance guarantees. Network performance guarantees may include,, for example, a minimum guarantee of bandwidth along a communications path, or a maximum bound on the time duration during which a data packet within an existing communication may be delayed.

The second class, which is referred to as "reservationless", is very useful for nodes incapable of describing their expected data transmission behavior. Such nodes typically support bursty or unpredictable data transmission rates. In the Second class, nodes do not specify a data transmission rate, nor a bound, and in return are not accorded network performance guarantees, These nodes must therefore adapt to changing network conditions to achieve their desired data transfer goals. Such adaption includes employing buffering, the use of a storage device to compensate for a difference in rate of data flow when transferring data from one node to another, and congestion control strategies, the use of both data transmission schedulers at queuing points and data flow control protocols at traffic sources. Conventional buffering and congestion control strategies however are either inefficient, as they tend to under utilize available transmission bandwidth by being overly conservative, or impractical for public data networks as they require individual nodes to actively cooperate with the network in congestion control. These strategies are also complicated and expensive, requiring the network to supply status information to each of the individual nodes, which the nodes use to adjust their data transmission rate.

Thus, inefficiencies, expenses and complications result because conventional approaches fail to appreciate the complex scheduling requirements inherent to reservationless data transmission and source node behavior, and remain an obstacle to realizing complete integrated network functionality. In particular, consider initializing a node for reservationless data transmission where it is desirable to quickly reach a data transmission rate corresponding to an optimal set point, in other words, where associated data buffers, maintaining data packets to be transmitted, are neither overflowing nor under-flowing. A common approach is to begin operating at an initial data transmission rate, generally chosen ad hoc, and to increase the transmission rate linearly until the optimal set point is reached. This is a poor approach when, for example, the initial data transmission rate chosen is 10, the linear increase rate is one, and the optimal set point is 200, requiring an additional 190 round-trip data transmissions before the node transmits at its optimal rate. Worse, the implicit assumption is that the optimal set point does not change, which in some schemes is not correct. In the situation in which the optimal point changes frequently and dramatically, the node may never transmit at a current optimal set point.

Alternatively, assume that a reservationless system is already transmitting data packets at an optimal rate. The system encounters some arbitrary or unforeseen event causing the loss of a transmitted data packet. A common approach is to discover the data packet loss through a timer. The expiration of which causes the retransmission of the outstanding data packet or packets. The timer generally begins counting when the data packet is transmitted and ends either upon receipt of the data packet by the destination node or upon the timer exceeding some predetermined time period. If the time period chosen is too small, numerous unnecessary retransmissions will occur, resulting in network congestion. Conversely, if the time period is too large, long pauses will result and the available data transmission bandwidth will be wasted. Further, and fundamentally, the approach treats data packet loss as part of the reservationless flow control, instead of the loss of the data packet as part of error control so that the transmission rate is drastically decreased in response thereto.

SUMMARY OF THE INVENTION

The problems of the prior art nodal data transmission approaches are overcome in accordance with the principles of the present invention which utilize sophisticated techniques for nodal data transmission initialization, intelligent retransmission in response to data packet loss, and buffer management.

One method of operation in accordance with the principles of the present invention concerns the control of data packet transmission from a source node over a processing system network wherein a target transmission rate corresponding to a target operating point is an estimate of an optimal operating rate corresponding to an optimal set point. This method includes the steps of transmitting a data packet at an adaptive exponential transmission rate from a current operating point to the target operating point, and upon a determination that the optimal operating point has not been reached, recalculating the target operating point. In one embodiment, the step of recalculating the target operating point includes receiving an acknowledgement signal of data signals for each transmitted data packet wherein the acknowledgment signal represents the sequence number of a particular received transmitted data packet. In another embodiment, the step of recalculating the target operating point further includes determining if the optimal set point has been reached as a function of the acknowledgement signal. In a further embodiment, the source node, upon reaching the optimal set point, continuously transmits subsequent data packets at that optional operating rate.

Another method of operation concerns the control of data packet transmission from a source node over a processing system network, and includes the steps of transmitting a data packet, receiving an acknowledgment signal, and evaluating the acknowledgment signal to determine if the data packet has been lost or received. More particularly, a next data packet is transmitted from the start at an optimal operating rate corresponding to an optimal set point. The next data packet includes a sequence number representing the next data packet's position within a sequence of previously transmitted data packets. The source node receives an acknowledgment signal of data signals corresponding to each received transmitted data packet, wherein the acknowledgment signal preferably includes both a key and an offset. The acknowledgment signal is evaluated preferably as a function of the key and the offset to determine if a prior data packet has been received, and upon a determination that the prior data packet has not been received, retransmitting the prior data packet from the source node. In one embodiment, the method further includes increasing the operating rate thereby probing a bottleneck buffer size to determine if the current operating point has exceeded a boundary causing data packet loss, and upon such a determination, decreasing the current operating point and corresponding operating rate. In another embodiment, the key and offset are monitored for each received acknowledgment signal to determine if the retransmitted data packet has been received. In a further embodiment, the method determines whether the bandwidth of the processing system network has increased, and upon such a determination, redetermine the optimal operating rate utilizing and adaptive exponential transmission rate. In a still further embodiment, a timer is set as each of the data packets is transmitted, and preferably, a timeout bound is computed by evaluating the transmission throughput of the processing system network. Upon a determination that the timeout bound has been exceeded, each transmitted data packet and each retransmitted data packet not received are present. In another embodiment, the acknowledgment signals associated with the retransmitted data packets are selectively examined to determine if the key has changed and, upon a determination that it has not, selectively sending previously transmitted and retransmitted data packets.

A processing system in accordance with the principles of the present invention for transmitting data packets at an optimal operating rate from a source node over an integrated network includes at least one memory storage device and at least one processing unit. Further, the data packet transmission is preferably independent of communication between the source node and the integrated network. The memory storage devices are operable to store a plurality of processing system instructions, as well as in alternate embodiments, to provide work areas and perform other storage operations. The processing units control data packet transmission by retrieving and executing at least one of the processing unit instructions from the memory storage devices. The processing unit instructions direct the processing unit to transmit a current data packet from the source node over an integrated network to a destination node. The current data packet preferably includes a sequence number representative of the position of the current data packet within a sequence of data packets transmitted from the source node. The processing unit is also operable to receive an acknowledgment signal at the source node for each received transmitted data packet, the acknowledgment signal preferably including a key and an offset and representative of the sequence number of a particular received transmitted data packet. Lastly, the processing unit is operable to evaluate each acknowledgment signal to determine if a prior data packet has not been received, and upon such a determination, to retransmit the prior data packet from the source node to the destination node.

In one embodiment, the processing unit is operable to transmit data packets at an optimal operating rate corresponding to an optimal set point, to detect data packet loss and to re-calculate the optimal operating rate in response thereto. In another embodiment the processing unit is operable to utilize dynamic set point probing in conjunction with the re-calculation of the optimal operating rate. In yet another embodiment, the processing unit is operable to probe a bottleneck buffer size in conjunction with the utilization of the dynamic set point probing. In a further embodiment, the processing unit is operable to monitor the key and the offset for each received acknowledgment signal to determine if the retransmitted prior data packet has been received.

One embodiment for using and/or distributing the present invention is as software stored to a storage medium. The software includes a plurality of computer instructions for controlling at least one processing unit for achieving and maintaining nodal data transmission rates in processing system networks in accordance with the principles of the present invention. The storage mediums utilized may include, but are not limited to, magnetic, optical, or semiconductor chip memory storage devices.

BRIEF DESCRIPTION OF THE DRAWINGS

For a more complete understanding of the present invention, and the advantages thereof, reference is made to the following descriptions taken in conjunction with the accompanying drawings in which like numbers designate like parts, and in which.

DETAILED DESCRIPTION OF THE INVENTION

Figure 1:
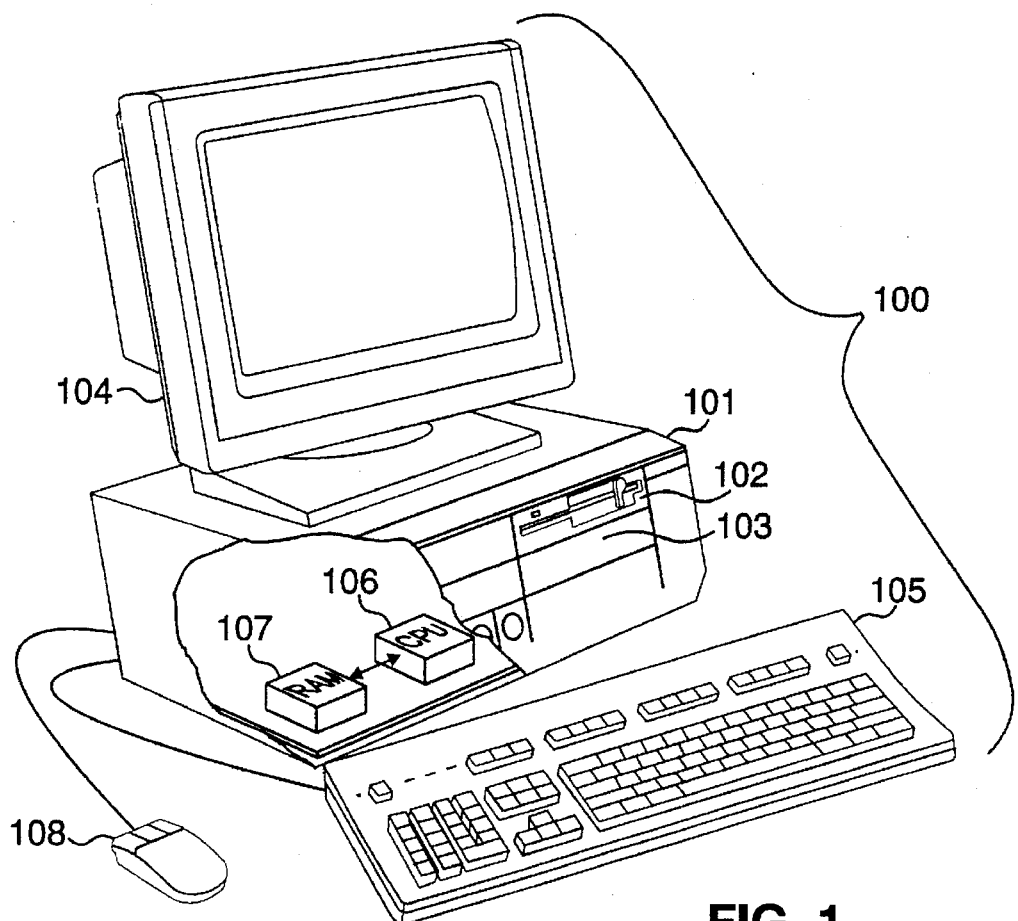
FIG. 1 illustrates an isometric view of a personal computer which may function as a node within a processing system network in accordance with the principles of the present invention.
Figure 3A:
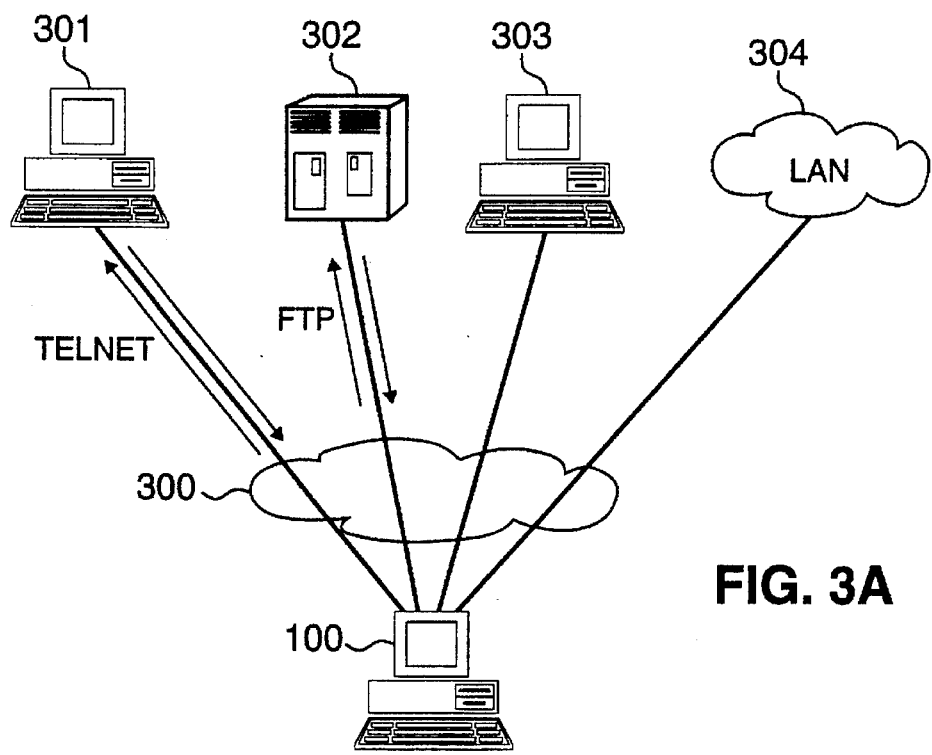
FIG. 3A illustrates a block diagram of an integrated network.
Figure 3B:
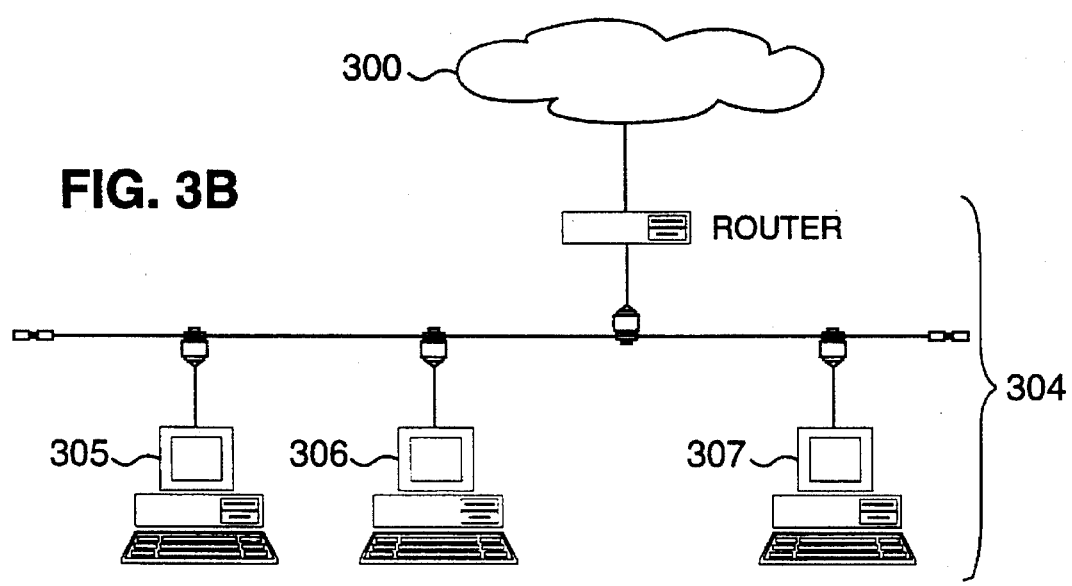
FIG. 3B illustrates a more detailed block diagram of the local area network illustrated in FIG. 3A.

FIG. 1 illustrates an isometric view of a personal computer ("PC") 100 which may function as a node within a processing system network illustrated in FIGS. 3A and 3B. PC 100 is comprised of a hardware casing 101 (illustrated as having a cut-away view), a monitor 104, a keyboard 105 and optionally a mouse 108. Note that the monitor 104, and the keyboard 105 and mouse 108 may be replaced by any suitably arranged output and input devices, respectively. Hardware casing 101 includes both a floppy disk drive 102 and a hard disk drive 103. Floppy disk drive 102 is operable to receive, read and write to external disks, while hard disk drive 103 is operable to provide fast access data storage and retrieval. Although only floppy disk drive 102 is illustrated, PC 100 may be equipped with any suitably arranged structure for receiving and transmitting data, including, for example, tape and compact disc drives, and serial and parallel data ports. Within the cut away portion of hardware casing 101 is a processing unit, central processing unit ("CPU") 106, coupled with a memory storage device, which in the illustrated embodiment is a random access memory ("RAM") 107. Although PC 100 is shown having a single CPU 106, PC 100 may be equipped with a plurality CPUs 106 operable to cooperatively carry out the principles of the present invention. Also, although PC 100 is shown having a single local memory storage device 107, PC 100 may be equipped with a plurality of local memory storage devices. Further, although PC 100 is being utilized for illustrating one implementation of a node within a processing system network, the invention may alternately be implemented within any processing system having at least one processing unit, including, for example, sophisticated calculators and hand held, mini, main frame and super computers, including RISC and parallel processing architectures, as well as within processing system network combinations of the foregoing.

Figure 2:
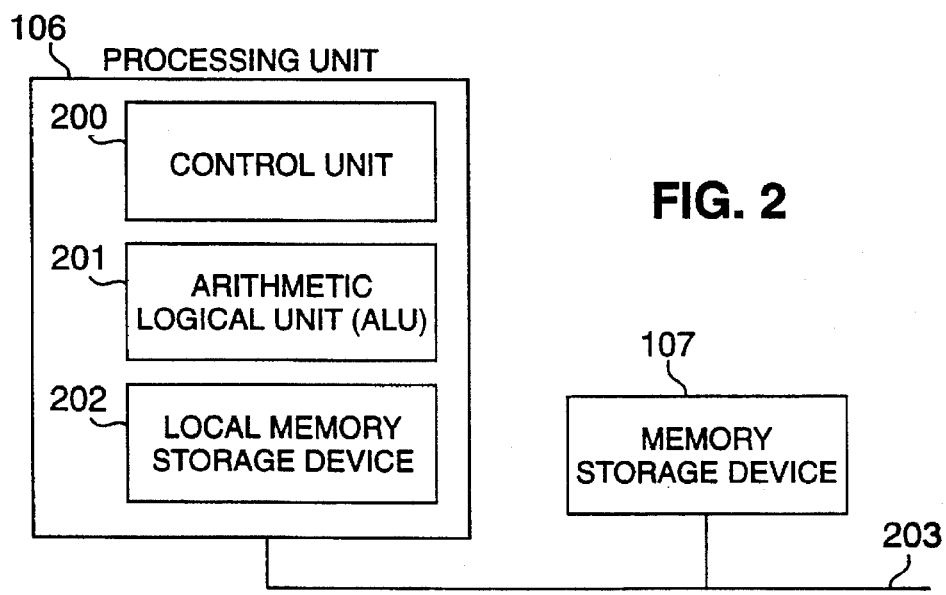
FIG. 2 illustrates a block diagram of a microprocessing system, including a single processing unit and a single memory storage device, which may be utilized in conjunction with the personal computer in FIG. 1.

FIG. 2 illustrates a block diagram of one microprocessing system, including a processing unit and a memory storage device, which may be utilized in conjunction with the personal computer in FIG. 1. The microprocessing system includes a single processing unit, such as CPU 106, coupled via data bus 203 with a memory storage device, such as RAM 107. Memory storage device 107 is operable to store one or more instructions which processing unit 106 is operable to retrieve, interpret and execute. Processing unit 106 includes a control unit 200, an arithmetic logic unit ("ALU") 201, and a local memory storage device 202, such as, for example, stackable cache or a plurality of registers. Control unit 200 is operable to fetch instructions from memory storage device 107. ALU 201 is operable to perform a plurality of operations, including addition and Boolean AND needed to carry out instructions. Local memory storage device 202 is operable to provide high speed storage used for storing temporary results and control information.

FIG. 3A illustrates a block diagram of an integrated network 300, such as an internet. The internet is generally defined as any collection of independent or distinct processing system networks working together as one, and may include a worldwide network of networks that are connected to each other using any one of a number of protocols, such as the Internet Protocol ("IP"). Protocols provide file transfer, remote log-in, electronic mail, and other services, including distributed processing, as well as other resources. IP, among its other facilities, enables a data packet from a source node, such as processing system 100 of FIG. 1, to traverse multiple networks on its way to a final destination node. The integrated network herein illustrated links processing system 100 with processing systems 301 to 303 and a local area network ("LAN") 304. LAN 304 is a communications network connecting various hardware devices together within a building or complex by means of a continuous cable or an in-house voice-data telephone system.

FIG. 3B illustrates a more detailed block diagram of LAN 304 illustrated in FIG. 3A. LAN 304 includes processing systems 305 to 307, which are interconnected by means of coaxial cable. The processing systems 305 to 307 are connected to the internet through a router. The router is a device operable to transfer data between two or more networks utilizing a common protocol. In the illustrated embodiment, it is preferred that all routers along the communications paths implement a round robin scheduling discipline, or a similar suitably arranged variant.

Figure 4:
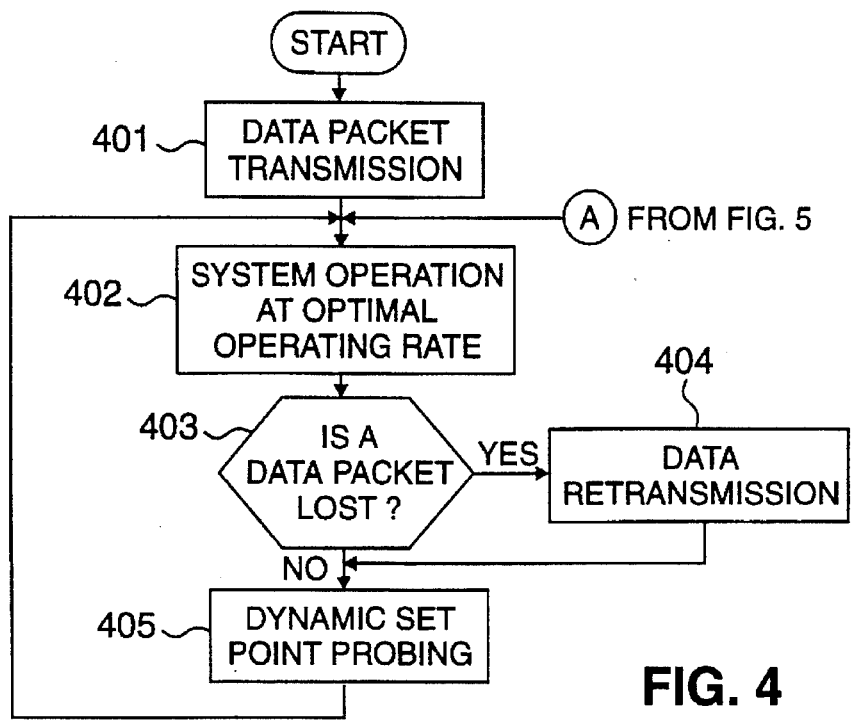
FIG. 4 illustrates a flow diagram for achieving and maintaining data transmission rates from a node over a processing system network in accordance with the principles of the present invention.

FIG. 4 illustrates a flow diagram for achieving and maintaining nodal data transmission rates in accordance with the principles of the present invention. One aspect of the present invention is the ability to achieve and maintain desired data transmission rates independent of communications between the node and the processing system network. Upon entering the START block, the process begins. Data packet transmission initialization, block 401, consists of transmitting a data packet at an adaptive exponential transmission rate from a current operating point to a target operating rate corresponding to a target operating point, and upon a determination that an optimal set point has not been reached, recalculating the target operating point in response to one or more received acknowledgement signals. More particularly, given the current operating point, the rate control exponentially increases from the current operating point to the target operating point. However, as the acknowledgment signals are received, providing new information about the processing system network's transmission bandwidth, the asymptote of the exponential rise is dynamically adjusted, providing an adaptive exponential rise to the optimal set point. The initialization process is more fully discussed with reference to FIG. 5.

Once the optimal operating point rate is reached, the process continues to transmit the data packets at an optimal operating rate corresponding to the optimal set point, block 402. Preferably, each data packet includes a sequence number representing its position within a sequence of previously transmitted data packets. While transmitting data packets, the process continuously monitors the receipt of acknowledgment signals, each of which corresponds to a received transmitted data packet, to determine as a function of the received acknowledgment signals if any data packets have been lost, block 403. Upon a determination that a particular data packet has not been received, YES branch of decisional block 403, the process retransmits the lost data packet, block 404.

Also, while transmitting data packets, the process continuously redetermines the optimal set point corresponding to the optimal operating rate through dynamic set point probing, block 405. In many processing system networks, the intermediate queuing points do not reserve a number of buffers per conversation. Hence, to maintain the optimal set point for reservationless data packet transmission, the procedure must adapt to changing network conditions caused by increasing and decreasing transmission bandwidth. Preferably, this adaptation is accomplished by systematically increasing the operating point additively until a packet loss is detected. Upon the detection of a packet loss, a fast retransmit, block 404, will occur and a multiplicative decrease will reduce the set point. Dynamic set point probing may therefore be defined, with reference to the illustrated embodiment, as the increasing of an optimal operating point while probing a bottleneck buffer size to determine if the new current operating rate has exceeded the optimal set point boundary causing packet loss, and upon such a determination, decreasing the current set point.

Figure 5:
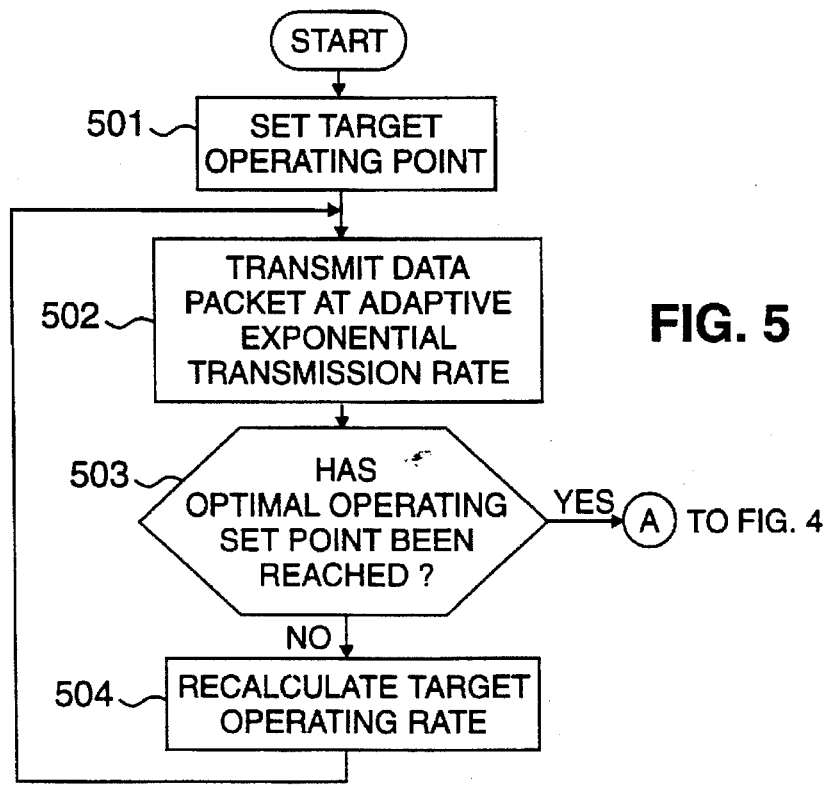
FIG. 5 illustrates a more detailed flow diagram in accordance with the illustrated embodiment of FIG. 4 for performing data packet transmission initialization.

FIG. 5 illustrates a more detailed flow diagram in accordance with the illustrated embodiment in FIG. 4 for performing data packet transmission initialization (block 401). Upon entering the START block the process begins, and a target operating point is set, block 501. In one embodiment, a source node transmits a data packet probe over the network, and waits a single round trip time for an associated acknowledgment signal to arrive. Receipt of the acknowledgment signal provides an estimate of the available network bandwidth enabling the source node to set the target operating point corresponding to a target operating rate. In an alternate embodiment, the single round trip time delay of the previous embodiment is avoided if the network can guarantee a nominal bandwidth from which the source node sets the target operating point. In another embodiment, the initial target operating point may be chosen ad hoc, for example, by best personal estimate.

The source node begins transmitting a data packet per operating cycle at an exponential transmission rate from a current operating point towards the target operating point, block 502. As the acknowledgment signals are received, providing better estimators of the network's available bandwidth, the source node determines whether the optimal operating set point has been reached, block 503. If the optimal set point has been reached, YES branch of decisional block 503, process control is passed to block 402 of FIG. 4. If the optimal set point has not been reached, NO branch of decisional block 503, then the asymptote of the exponential rise is dynamically adjusted using further received acknowledgment signals to recalculate the target operating point and hence the corresponding target operating rate, block 504. Preferably, the current operating point is recalculated utilizing the following equation:

$$\hat{n}_b(t) = S(t) - R\hat{\mu}_b(t)$$

Wherein $\hat{n}_b(t)$ is the estimated number of data packets in the bottleneck buffer at the beginning of the time t, S(t) is the number of unacknowledged data packets outstanding at the beginning of time t, R is the round trip, and $\hat{\mu}_b(t)$ is the estimated service rate at the bottleneck at the beginning of the time t. When the transmission rate is below the optimal set point, $\hat{n}_b(t)$ will be close to zero because the network service rate presently exceeds the transmission rate. However, as the target operating point approaches the optimal set point, $\hat{n}_b(t)$ will rise above zero and reach the optimal set point.

Following this recalculation, process control is returned to the source node, block 502, to transmit data packets at the adapted exponential transmission rate towards the recalculated target operating point. For example, starting at a time 0, the data packet transmission rate exponentially rises to the first target operating point. However, shortly after reaching the asymptote, fresh information about the next target operating point arrives causing the data packet transmission rate to move exponentially to the new target operating point. An aspect of the invention therefore is the assumption that the transmission information received initially is not very accurate, and by choosing the adaptive exponential rise, maneuverability is assured without sacrificing short data transfers.

Figure 6:
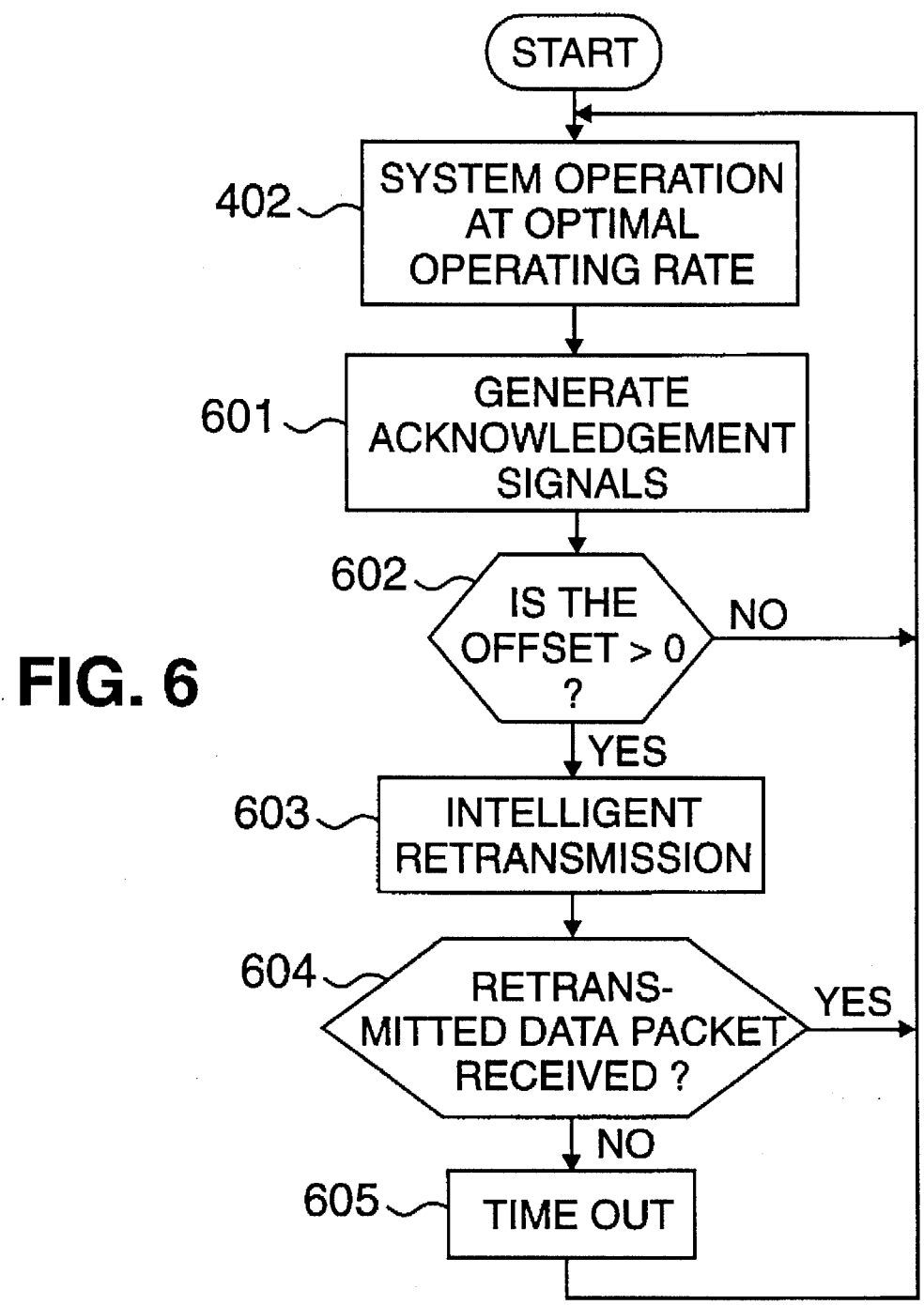
FIG. 6 illustrates a more detailed flow diagram in accordance with the illustrated embodiment of FIG. 4 for determining data packet loss and performing intelligent data packet retransmission.

FIG. 6 illustrates a more detailed flow diagram in accordance with the illustrated embodiment in FIG. 4 for determining data packet loss and performing intelligent data packet retransmission (blocks 403 and 404). Upon entering the START block, the process begins transmitting data packets, preferably at an optimal operating set point corresponding to an optimal operating rate, block 402. Each of the data packets, as defined hereinabove, preferably includes a sequence number which represents each data packet's position within a sequence of transmitted data packets. As the data packets are subsequently received, acknowledgment signals are generated at the destination nodes and sent back to the source node, block 601. Each of the acknowledgment signals, also as previously defined hereinabove, preferably includes both a key and an offset, wherein a data packet received in sequence returns an acknowledgment signal having a key equalling the sequence number of the received data packet and an offset equal to zero, NO branch of decisional block 602, returning process control to block 402. Conversely, a data packet received out of sequence returns an acknowledgment signal having a non-zero offset such that the combination of the key and the offset equal the out of sequence data packet's sequence number, YES branch of decisional block 602. For example, the illustrated embodiment assumes that the sequence number assigned to each data packet is that of the last in-sequence data packet, and that every data packet is acknowledged. Every acknowledgement carries a key and an offset. Thus, if the destination node receives sequence numbers 1, 2, 3, 4, 6, 7, 8 ... the acknowledgments will be (1,0), (2,0), (3,0), (4,0), (4,2), (4,3), (4,4) ... where each tuple is the sequence number of the acknowledgment, and the corresponding offset. A non-zero indicates that the packet with the sequence number one larger than the key must have been lost.

Although the illustrated embodiment utilizes sequence numbers and acknowledgment signals having keys and offsets, any suitably arranged signal for indicating to a source node the data packet loss, may be readily substituted for the foregoing.

The acknowledgment signal indicating a data packet loss triggers retransmission flow control whereby the non-zero information in the offset is utilized to perform intelligent retransmission, block 603. To attain this objective, the source node preferably maintains a transmission queue that buffers both incoming user data and data to be retransmitted. The transmission queue is preferably partitioned into a high priority zone at one end and a low priority zone at the other. Application data packets are preferably stored at the tail of the low priority zone, while data packets awaiting retransmission are stored at the tail of the high priority zone. In the illustrated embodiment, the destination node is preferably required to buffer received out of sequence data packets until the data packets can be processed or transferred to a third-party recipient in order. The advantage of placing the data packets to be retransmitted within the high priority zone is the reduction of buffer space needed by the destination node. The process removes data packets from the queue at the operating rate specified by the optimal operating set point. Thus, because the data packets to be retransmitted and the data share the same queue the operating rate remains unaffected by the process of data packet retransmission.

The source node, upon receipt of a non-zero offset, notes the data packet with the sequence number equal to key+ non-zero offset has reached a destination node safely. The source node also notes that the last safely received data packet had a sequence number equal to key+zero offset. Accordingly, the source node retransmits every data packet within the range (key+zero offset +1, key+non-zero offset−1) that has not been retransmitted earlier. To continue with the previous example, if the source node receives (4,2), it will retransmit the data packet with the sequence number 5 and note that the data packet with the sequence number 6 was correctly received. When however (4,3) is received, since 5 has been retransmitted, and 6 has been received, no retransmissions occur. Thus, with a single loss, a single retransmission will occur. Alternatively, if a large chunk of outstanding data packets are lost, they will be retransmitted. An aspect of the illustrated embodiment is that no data packet that has been correctly received and acknowledged is retransmitted. Preferably, the process monitors the key and the offset for each received acknowledgment signal to determine if the retransmitted data packet has been received. In one embodiment, monitoring is accomplished by selectively examining the acknowledgment signals associated with the retransmitted data packets to determine if the key has changed and, upon a determination that the key has not changed, selectively sends previously transmitted and retransmitted data packets from the source node to the destination node.

A further aspect of the illustrated embodiment, includes a safety mechanism in the event that the monitored retransmitted packet is also not received, NO branch of block 604, for the utilization of a timer, block 605. In order to minimize the operating system requirements, time outs are preferably accomplished utilizing a single shared timer, instead of a per data packet timer. The timer is re-initialized at the start of every data packet transmission and retransmission. Upon the timer reaching or exceeding a predetermined bound, the data transmission flow control is put entirely into the retransmission queue, except for data packets that have been received correctly. Thus, if there are multiple losses in a round trip time, they are automatically retransmitted. Further, a timeout bound is preferably computed by evaluating the transmission throughput of the processing system network.

Although the present invention and its advantages have been described in detail, it should be understood that various changes, substitutions and alterations can be made herein without departing from the spirit and scope of the invention.

I claim:

1. A method for controlling data packet transmission from a source node over a processing system network said method comprising the steps of:

a) transmitting a data packet at an adaptive exponential transmission rate from a current operating point to a target operating point, said target operating point being an estimate of an optimal set point;

b) receiving an acknowledgement signal representative of a sequence number of a particular received transmitted data packet;

c) recalculating, upon a determination that said optimal set point has not been reached, said target operating point and returning to step a.

2. The method as set forth in claim 1 wherein said recalculating step further includes the step of determining if said optimal set point has been reached as a function of said acknowledgement signal.

3. The method as set forth in claim 1 further including the step of sending a data packet at an optimal operating rate corresponding to said optimal set point.

4. The method as set forth in claim 3 wherein each of said transmitted data packets includes a sequence number representative of the position of each of said transmitted data packets within a sequence of data packets transmitted from said source node and wherein said transmitting step is preceded by the step of assigning a current sequence number to each said data packet.

5. The method as set forth in claim 4 wherein said acknowledgement signal includes a key and an offset and further includes the step of evaluating said key and said offset for each received acknowledgment signal to determine if a prior transmitted data packet has been lost, and upon such a determination, re-transmitting said prior transmitted data packet from said source node.

6. The method as set forth in claim 5 further including the step of monitoring said key and said offset for each received acknowledgment signal to determine if said retransmitted data packet has been received.

7. The method as set forth in claim 6 further including the step of setting a timer as each said data packet is transmitted.

8. The method as set forth in claim 7 wherein a timeout bound is computed by evaluating the transmission throughput of said processing system network and further including, upon a determination that said timeout bound has been exceeded by said timer, the step of forwarding each said transmitted data packet and each said retransmitted data packet which have not been received.

9. The method as set forth in claim 7 wherein said monitoring step further includes the step of selectively examining said acknowledgment signals associated with said retransmitted data packets to determine if said key has changed and, upon a determination that said key has not changed, selectively sending previously transmitted and retransmitted data packets from said source node.

10. The method as set forth in claim 3 further including the step of increasing said optimal operating rate while probing a bottleneck buffer size to determine if said optimal operating rate has exceeded a boundary causing data packet loss, and upon such a determination, decreasing said optimal operating rate.

11. The method as set forth in claim 10 further including the step of repeating said increasing step while said data packets are transmitted at said optimal set point.

12. The method as set forth in claim 3 further including the step of determining whether a bottleneck buffer size is less than said optimal set point, and upon such a determination, redetermining said optimal set point utilizing said adaptive exponential transmission rate.

13. A method for controlling data packet transmission from a source node over a processing system network, said method comprising the steps of:

a) transmitting a next data packet at an optimal operating rate corresponding to an optimal set point, said next data packet including a sequence number representative of the position of said next data packet within a sequence of data packets transmitted from said source node;

b) receiving an acknowledgment signal of data signals at said source node for each received transmitted data packet, said acknowledgment signal including a key and an offset, and representative of the sequence number of a particular received transmitted data packet; and c) evaluating each said acknowledgment signal as a function of said key and said offset to determine if a prior data packet has been received, and upon a determination that said prior data packet has not been received, retransmitting said prior data packet from said source node.

14. The method as set forth in claim 13 further including the step of returning to step a).

15. The method as set forth in claim 14 further including the step of monitoring said key and said offset for each received acknowledgment signal to determine if said retransmitted data packet has been received.

16. The method as set forth in claim 15 further including the step of starting a timer upon the transmission of a first data packet, and thereafter setting said timer as each subsequent data packet is transmitted.

17. The method as set forth in claim 15 wherein said monitoring step further includes the step of selectively examining said acknowledgment signals associated with said retransmitted data packets to determine if said key has changed and, upon a determination that said key has not changed, selectively sending previously transmitted and retransmitted data packets from said source node.

18. The method as set forth in claim 16 wherein a timeout bound is computed by evaluating the transmission throughput of said processing system network and further including, upon a determination that said timeout bound has been exceeded, the step of sending each said transmitted data packet and each said retransmitted data packet which have not been received.

19. The method as set forth in claim 13 further including the step of increasing said optimal operating rate while probing a bottleneck buffer size to determine if said optimal operating rate has exceeded a boundary causing data packet loss, and upon such a determination, decreasing said optimal operating rate.

20. The method as set forth in claim 19 further including the step of repeating said increasing step while said data packets are transmitted.

21. The method as set forth in claim 13 further including the step of determining whether the bandwidth of said processing system network has increased, and upon such a determination, redetermining said optimal set point corresponding to said optimal operating rate utilizing an adaptive exponential transmission rate.

22. The method as set forth in claim 13 wherein said transmitting step is preceded by a start-up phase including the step of sending ones of a plurality of data packets at an adaptive exponential transmission rate from a current operating point to a target operating point, said target operating point being an estimate of an optimal set point.

23. The method as set forth in claim 22 further including the step of recalculating, upon a determination that said optimal set point has not been reached, said target operating point.

24. The method as set forth in claim 23 further including the step of receiving said acknowledgement signal for each transmitted data packet.

25. The method as set forth in claim 24 further including the step of determining if said optimal set point has been reached as a function of said received acknowledgement signal.

26. A processing system for transmitting data packets from a source node over a processing system network independent of communication between said source node and said processing system network, said processing system comprising:

at least one memory storage device operable to store a plurality of processing system instructions; and at least one processing unit for controlling data packet transmission from said source node over said processing system network by retrieving and executing at least one of said processing unit instructions from said memory storage device, said processing unit operable to:

transmit a current data packet from said source node over said integrated network to a destination node at an optimal operating rate corresponding to an optimal set point, wherein said current data packet includes a sequence number representative of the position of said current data packet within a sequence of data packets previously transmitted from said source node;

receive an acknowledgment signal for each received transmitted data packet, said acknowledgment signal including a key and an offset, and representative of the sequence number of a particular received transmitted data packet; and evaluate each said acknowledgment signal as a function of said key and said offset to determine if a prior data packet has not been received by said destination node, and upon such a determination, retransmit said prior data packet from said source node to said destination node.

27. The processing system as set forth in claim 26 wherein said processing unit is further operable to utilize dynamic set point probing in conjunction with re-calculation of said optimal operating rate.

28. The processing system as set forth in claim 27 wherein said processing unit is further operable to probe a bottleneck buffer size in conjunction with the utilization of said dynamic set point probing.

29. The processing system as set forth in claim 26 wherein said processing unit is operable to initialize said processing system.

30. The processing system as set forth in claim 30 wherein said processing unit is operable, during said initialization, to send a series of data packets over said integrated network to said destination node at an adaptive exponential transmission rate from a current operating point corresponding to a current operating rate to a target operating point corresponding to a target operating rate, said target operating point being an estimate of said optimal set point.

31. The processing system as set forth in claim 30 wherein said processing unit is further operable to determine whether said optimal set point has been reached in response to said acknowledgment signal.

32. The processing system as set forth in claim 31 wherein said processing unit is further operable to recalculate, upon a determination that said optimal set point has not been reached, said target operating point.

33. The processing system as set forth in claim 26 wherein said processing unit is further operable to monitor said key and said offset for each received acknowledgment signal to determine if said retransmitted data packet has been received.

34. The processing system as set forth in claim 33 wherein said processing is further operable to set a timer as each said data packet is transmitted.

35. The processing system as set forth in claim 34 wherein a timeout bound is computed by evaluating the transmission throughput of said processing system network and said processing unit is further operable, upon a determination that said timeout bound has been exceeded, to send each said transmitted data packet and each said retransmitted data packets which have not been received.

* * * * *